(12) United States Patent  (10) Patent No.: US 6,742,495 B2
Ashida et al.  (45) Date of Patent: Jun. 1, 2004

(54) ENGINE CONTROL APPARATUS

(75) Inventors: Masaaki Ashida, Yokohama (JP); Kouichi Mori, Ayase (JP); Ritsuo Sato, Yokohama (JP); Yoshinao Ugomori, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/405,579

(22) Filed: Apr. 3, 2003

(65) Prior Publication Data

US 2003/0196636 A1 Oct. 23, 2003

(30) Foreign Application Priority Data

Apr. 19, 2002 (JP) .......................................... 2002-117073

(51) Int. Cl.[7] ................................................. F02P 15/02
(52) U.S. Cl. ...................... 123/310; 123/432; 123/491; 123/568.17
(58) Field of Search ................................ 123/308, 310, 123/432, 491, 90.15, 568.17

(56) References Cited

U.S. PATENT DOCUMENTS

| 4,528,958 | A | * | 7/1985 | Yoshida et al. .............. 123/442 |
| 4,614,174 | A | * | 9/1986 | Tanigawa et al. ............ 123/478 |
| 4,617,896 | A | * | 10/1986 | Yoshikawa ................... 123/432 |
| 4,702,207 | A | * | 10/1987 | Hatamura et al. ........... 123/302 |
| 5,427,078 | A | * | 6/1995 | Hitomi et al. ............. 123/559.1 |

FOREIGN PATENT DOCUMENTS

| JP | 6-193456 A | 7/1994 |
| JP | 6-213081 A | 8/1994 |
| JP | 7-197831 A | 8/1995 |

* cited by examiner

*Primary Examiner*—John Kwon
(74) *Attorney, Agent, or Firm*—Foley & Lardner LLP

(57) ABSTRACT

The invention comprises at least two independent intake ports 14a, 14b connected to a combustion chamber 15, two intake valves 12a, 12b, and two exhaust valves 13a, 13b. Upper and lower channels 22a, 22b which are defined by a partition wall, and an intake control valve 25 for opening and closing the lower side channel 22b are provided in the interior of the first intake port 14a. An intake control valve 26 for opening and closing the first intake port 14b is also provided. The invention further comprises a controller 50 for controlling the opening and closing of the intake control valves 25 and 26, and the degree of opening of these intake control valves 25 and 26 is controlled in accordance with the operating conditions.

39 Claims, 12 Drawing Sheets

ENGINE CONTROL APPARATUS

TECHNICAL FIELD OF THE INVENTION

This invention relates to a control apparatus for stabilizing combustion in an engine.

TECHNICAL BACKGROUND OF THE INVENTION

A device for controlling gas flow in a combustion chamber to improve the combustion characteristic of an engine by providing two independent intake ports in a cylinder, disposing a control valve upstream of each of these ports, the primary port and secondary port, and opening and closing these control valves in accordance with the engine operating conditions, is proposed in JP6-193456A, JP7-197831A, and JP6-213081A, which are Japanese Patent Publications.

SUMMARY OF THE INVENTION

In the invention in the first publication, during a partial load operating period or the like, the gas flow in a cylinder is raised by half-opening the primary port and closing the secondary port. However, the directivity of the intake air flow through the intake port is weak, and thus a strong gas flow cannot be obtained inside the combustion chamber.

In the invention in the second publication, fresh air is introduced from the primary port and recirculated exhaust gas is introduced into the closed secondary port, but here also, the directivity of the intake air flow through the intake port is weak and a strong gas flow cannot be generated.

In the invention in the third publication, on the other hand, the interior of the intake port is partitioned by a current plate such that fresh air is introduced from the upper level and recirculated exhaust gas is introduced from the lower level. However, since the primary and secondary intake ports are open at all times, interference with the gas flow in the combustion chamber is likely, and stratification of the recirculated exhaust gas is impossible, and as a result, raising the threshold of exhaust gas circulation proved difficult.

An object of this invention is to provide a combustion control apparatus for an engine which is designed to improve the combustion characteristic by generating a strong gas flow in a combustion chamber corresponding to the engine operating conditions.

In order to achieve above the object this invention provides a control apparatus for an internal combustion engine having an intake valve and an exhaust valve, comprising, at least two independent intake ports, a first and a second intake port, connected to an engine combustion chamber, upper and lower channels which are defined by a partition wall extending along the axial direction of the interior of the first intake port, a first intake control valve provided in the first intake port for opening and closing any one of the channels, a second intake control valve for opening and closing the second intake port on the upstream side of the intake valve, and a controller for controlling the first and second intake control valves in accordance with the operating conditions. The details as well as other features and advantages of the invention are set forth in the remainder of the specification and are shown in the accompanying drawings.

PREFERRED EMBODIMENTS OF THE INVENTION

Embodiments of this invention will be described below on the basis of the drawings.

Figure 1:
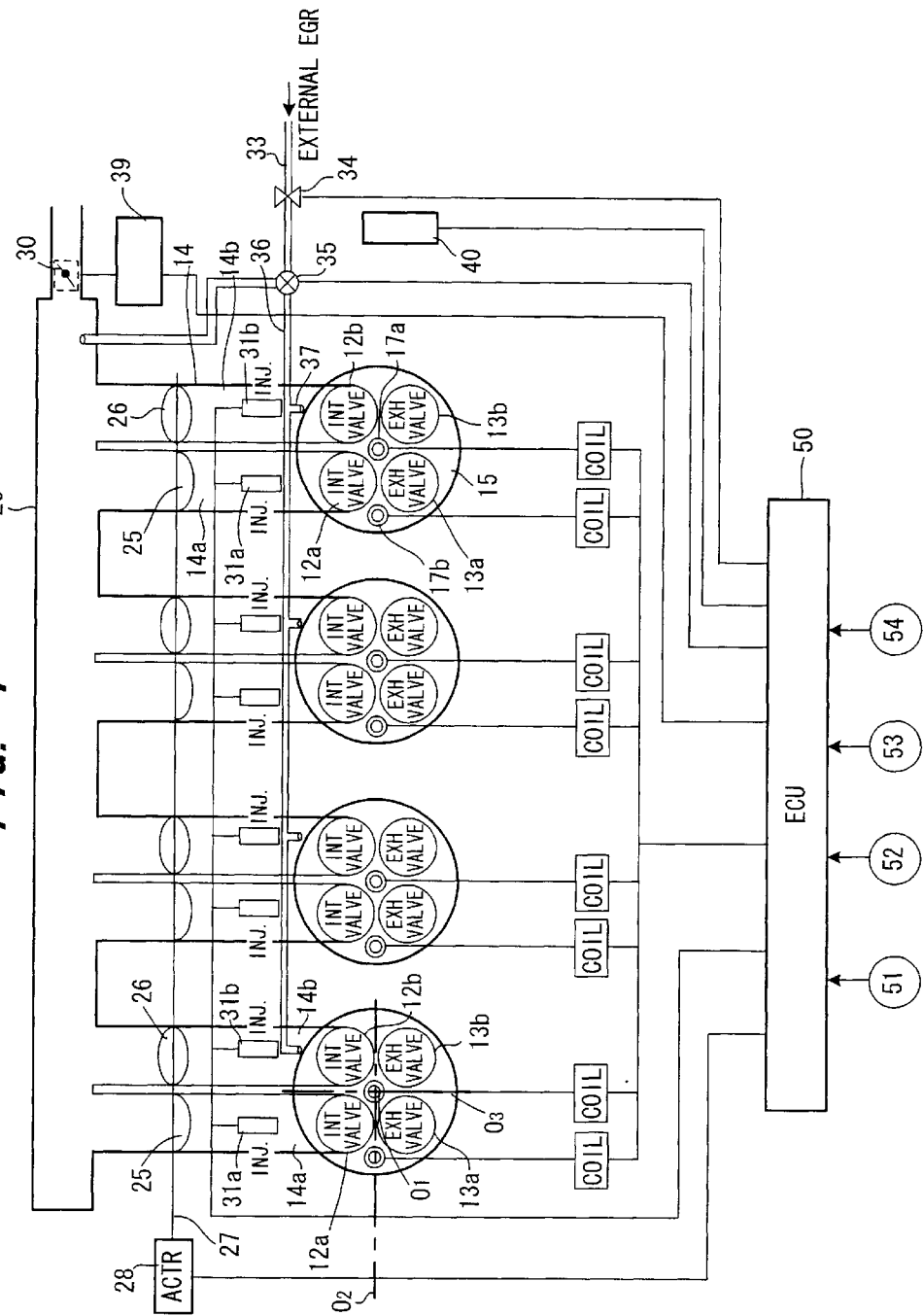
FIG. 1 is a schematic diagram of a first embodiment of this invention.
Figure 2:
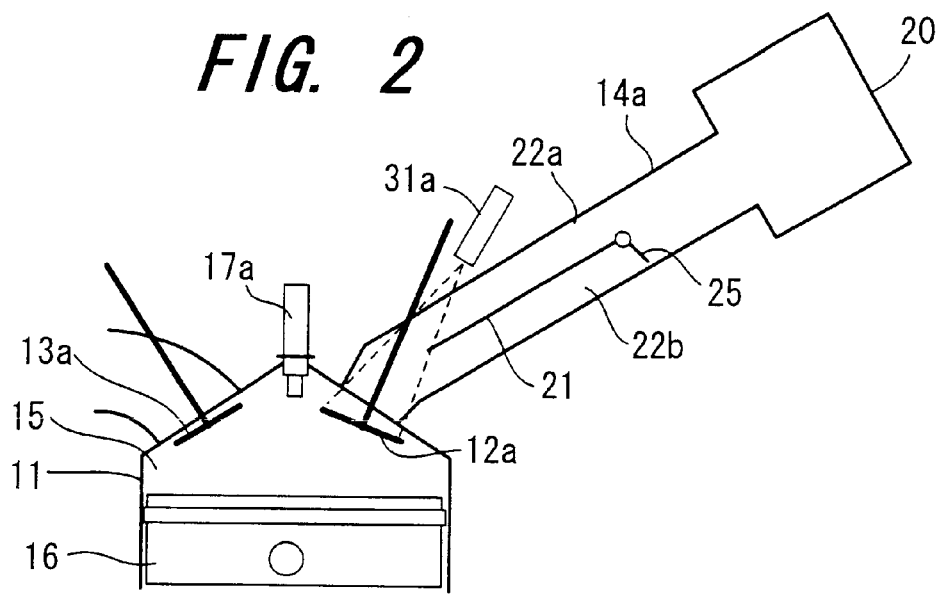
FIG. 2 is a cross section of a primary intake port.
Figure 3:
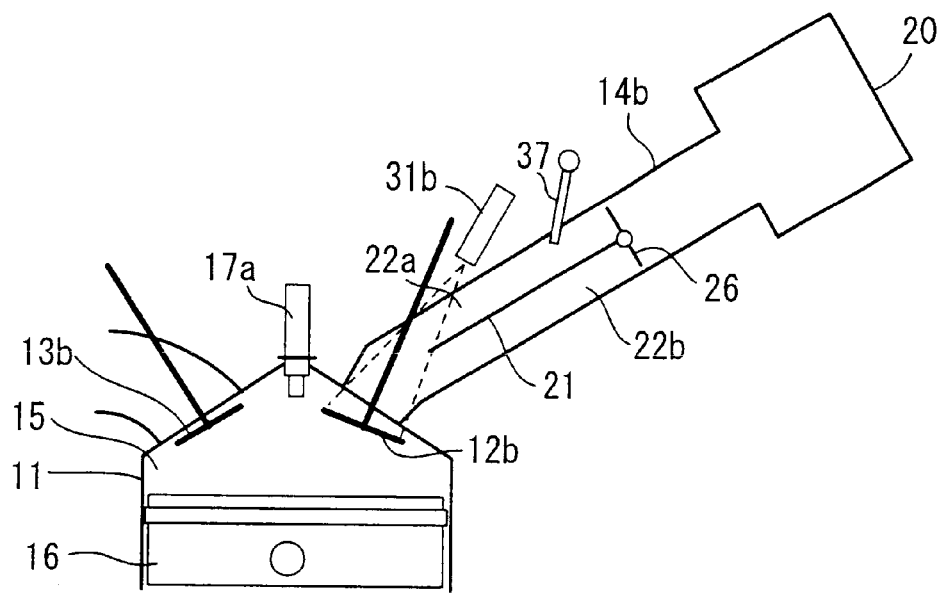
FIG. 3 is a cross section of a secondary intake port.

In a first embodiment shown in FIGS. 1 through 3, an engine main body comprises four cylinders 11, each cylinder 11 having two intake valves 12a, 12b and two exhaust valves 13a, 13b. An intake port is constituted by a mutually independent primary port (first intake port) 14a and secondary port (second intake port) 14b which serve as an intake port 14. The intake valves 12a, 12b open and close an opening portion from the primary port 14a and secondary port 14b to a combustion chamber 15 inside the cylinder.

A piston 16 is disposed within the cylinder, and two spark plugs 17a, 17b are attached to the combustion chamber 15 in a position above the piston 16. As regards the disposal of the spark plugs 17a, 17b, one of the spark plugs 17a is disposed near the center of the combustion chamber, and the other spark plug 17b is disposed on the periphery of the combustion chamber further toward the outside than the intake valve 12a and exhaust valve 13a on the primary side and on a cylinder series center line O2 which connects the center of each cylinder.

When air-fuel mixture inside the combustion chamber is ignited by the spark plugs 17a, 17b, the resultant combustion energy causes the piston 16 to perform a reciprocating motion, whereupon a crankshaft, not shown, rotates and engine output is produced.

A catalyst, not shown, is provided in an exhaust passage connected to an exhaust port 18 for purifying the exhaust gas which is discharged from the combustion chamber 15 when the exhaust valves 13a, 13b are opened.

The primary port 14a and secondary port 14b are formed in parallel to each other on a plane perpendicular to a cylinder axis O1 which is in alignment with the cylinder shaft, and are disposed equally on the two sides of an intersecting line O3 which passes through this cylinder axis O1 and intersects the above-mentioned cylinder series center line O2 at a right angle.

Hence the primary port 14a and secondary port 14b are disposed substantially symmetrically around the intersecting line O3 which passes through the center of the cylinder, thus constituting a so-called straight port. As a result, when intake air is introduced into the combustion chamber from the primary port 14a and secondary port 14b respectively, the majority thereof forms mutually independent and equal tumble flows in the combustion chamber. Further, when intake air is introduced from only one of the intake ports, the primary port 14a for example, a swirl flow component is produced along the inner periphery of the cylinder as well as a tumble flow component, thereby producing a composite gas flow.

The upstream side of the intake port 14 is connected to a collector 20, and the primary port 14a and secondary port 14b form mutually independent ports up to the collector 20.

As is understood from FIGS. 2 and 3, the interior of the intake port 14 (primary port and secondary port), which is formed at an incline with respect to the cylinder axis O1, is partitioned into upper and lower channels 22a and 22b by a partition wall 21 disposed substantially in the direction of the port axis. The partition wall 21 is not provided along the entire length of the intake port 14, but starts from a position slightly upstream of the middle position of the intake port 14, the tip thereof extending to the combustion chamber side to an extent that the tip does not interfere with the intake valves 12a, 12b, and/or to a position at which fuel spray from fuel injection valves 31a, 31b does not directly impinge thereon. In effect, this partition wall 21 should be long enough to provide strong directivity, or in other words inertial force, to the flow of intake air flowing through the upper and lower chamber produces a gas flow which is strongly influenced by the height, directional properties of the channels 22a, 22b.

As illustrated in FIG. 2, the primary port 14a is provided with a half-closing type first intake control valve (to be referred to as "half-closing valve" below) 25 which is positioned at the inlet part of the channels 22a, 22b partitioned by the partition wall 21 and which is capable of opening and closing only the downstream channel 22b.

Further, as illustrated in FIG. 3, the secondary port 14b is provided with a fully-closing type second intake control valve (to be referred to as "fully-closing valve" below) 26 which is similarly positioned at the inlet part of the channels 22a, 22b and which is capable of simultaneously opening and closing both the upper and lower channels 22a and 22b. As illustrated in FIG. 1, the half-closing valve 25 and fully-closing valve 26 are both attached to the same rotary shaft 27 which is disposed so as to pass through each intake port 14 in the direction of the cylinder series. The rotary shaft 27 is rotated by a rotary actuator 28 coupled to the end portion hereof to form a constitution in which the half-closing valve 25 and the fully-closing valve 26 open and close by rotating synchronously with each other.

The primary port 14a and secondary port 14b are also respectively provided with fuel injection valves 31a, 31b which are positioned downstream of the half-closing valve 25 and fully-closing valve 26. The position and direction of these fuel injection valves 31a and 31b are set such that fuel can be injected toward the interior of the combustion chamber from the rear face of the intake valves 12a and 12b, and preferably such that fuel can be injected uniformly through the upper and lower channels 22a and 22b without collision the partition wall 21.

An exhaust gas recirculation passage 33 is provided for recirculating a part of the exhaust gas through the intake air. This exhaust gas recirculation passage 33 is provided with an exhaust gas recirculation control valve 34 for controlling the amount of recirculated exhaust gas and a directional control valve 35 on the downstream side thereof. The exhaust gas recirculation passage 33 is connected to the aforementioned collector 20 downstream of a throttle valve 30, and a branch passage 36 branches off at the directional control valve 35. This branch passage 36 is connected via a recirculation port 37 to only the secondary port 14b of the intake port 14 in each cylinder on the downstream side of each fully-closing valve 26.

The directional control valve 35 switches the flow direction of the recirculating exhaust gas flowing through the exhaust gas recirculation passage 33, and hence when the directional control valve 35 is switched, recirculating exhaust secondary port 14b from the branch passage 36. In this case, when recirculating exhaust gas is introduced into the collector 20, the gas flows therefrom into the primary port 14a and secondary port 14b at an equal concentration.

The throttle valve 30 controls the amount of air intake into the engine and is driven by a throttle actuator 39.

A valve timing variable control mechanism 40 is also provided for variably controlling the operation timing of the intake valves 12a, 12b and the exhaust valves 13a, 13b. Thus the open/close timing of the intake valves 12a, 12b and exhaust valves 13a, 13b can be uniformly altered in accordance with the operating conditions, and one of the exhaust valves 13a, 13b can be opened or closed independently while the other remains closed. This valve timing variable control mechanism 40 is also capable of variably controlling the open/close timing of the intake valves 12a, 12b and exhaust valves 13a, 13b independently of one another.

A controller (control means) 50 is provided for controlling the respective operations of the rotary actuator 28, throttle actuator 39, valve timing variable control mechanism 40, exhaust gas recirculation control valve 34, and directional control valve 35 in accordance with the operating conditions, as will be described below. The controller 50 also controls the fuel injection amount from the fuel injection valves 31a, 31b, and also controls the ignition timing of each of the spark plugs 17a, 17b.

For this purpose, signals representing the operating conditions such as a rotation speed signal from an engine rotation speed sensor 51, an intake air amount signal from an intake air amount sensor 52, an accelerator opening signal from an accelerator opening sensor 53, and a water temperature signal from an engine water temperature sensor 54 are input into the controller 50, on the basis of which the operations of each of these areas are controlled as will be described in detail below.

These operations will be described in detail with reference to the tiring charts illustrated in FIGS. 4, 6, and 7.

Figure 4:
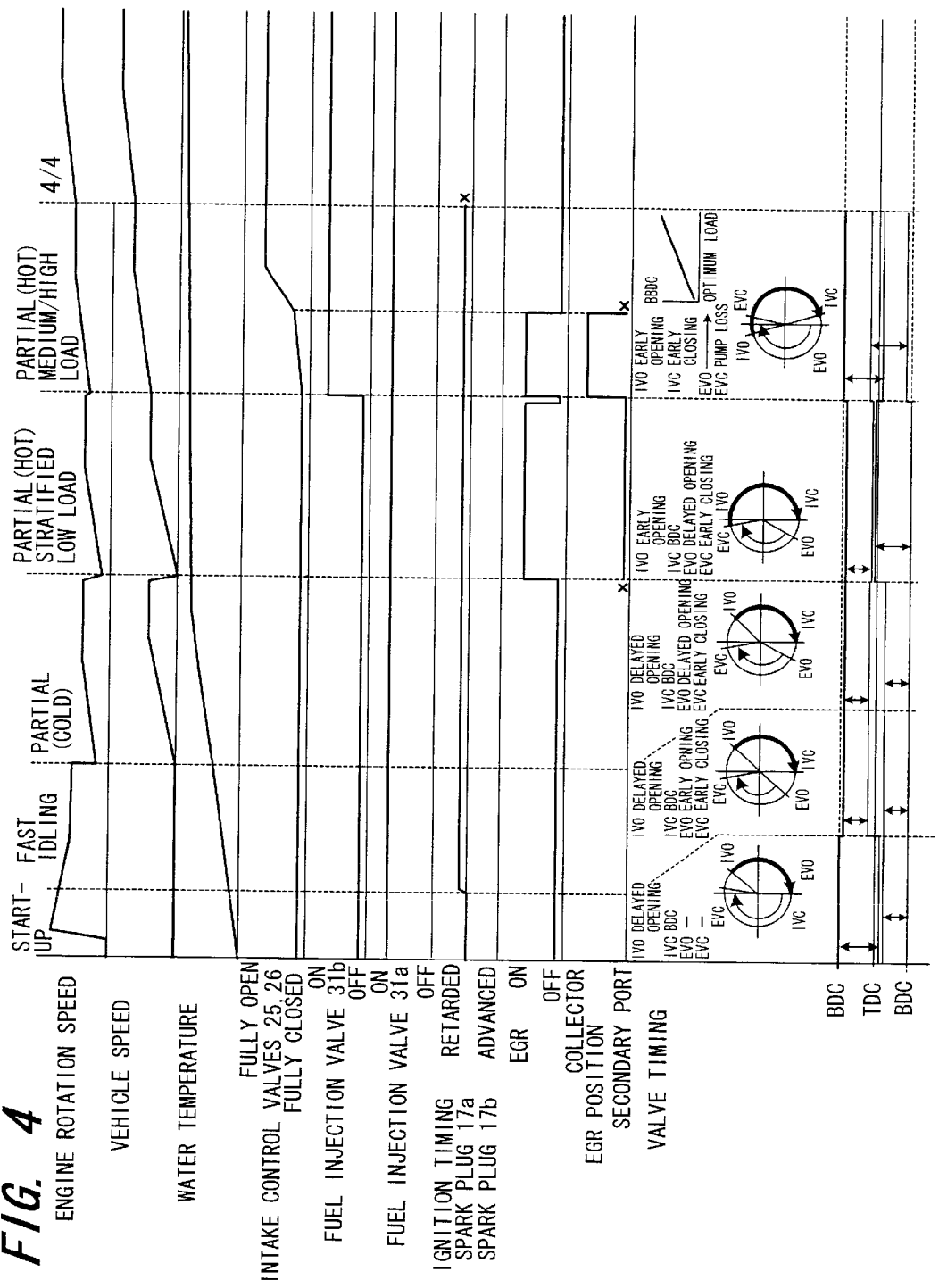
FIG. 4 is a timing chart showing an operation.
Figure 6:
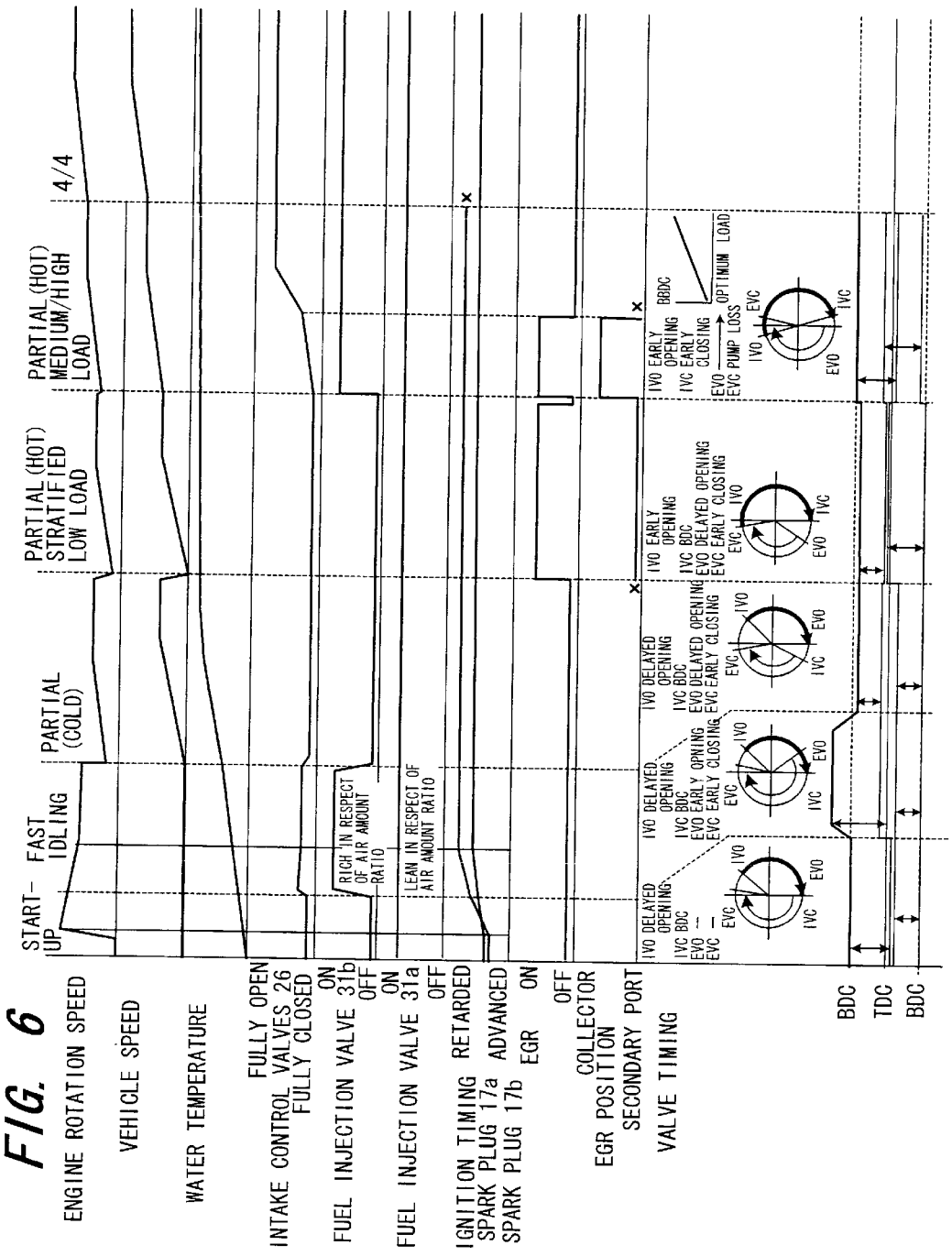
FIG. 6 is a tiring chart showing a different operation of the first embodiment.
Figure 7:
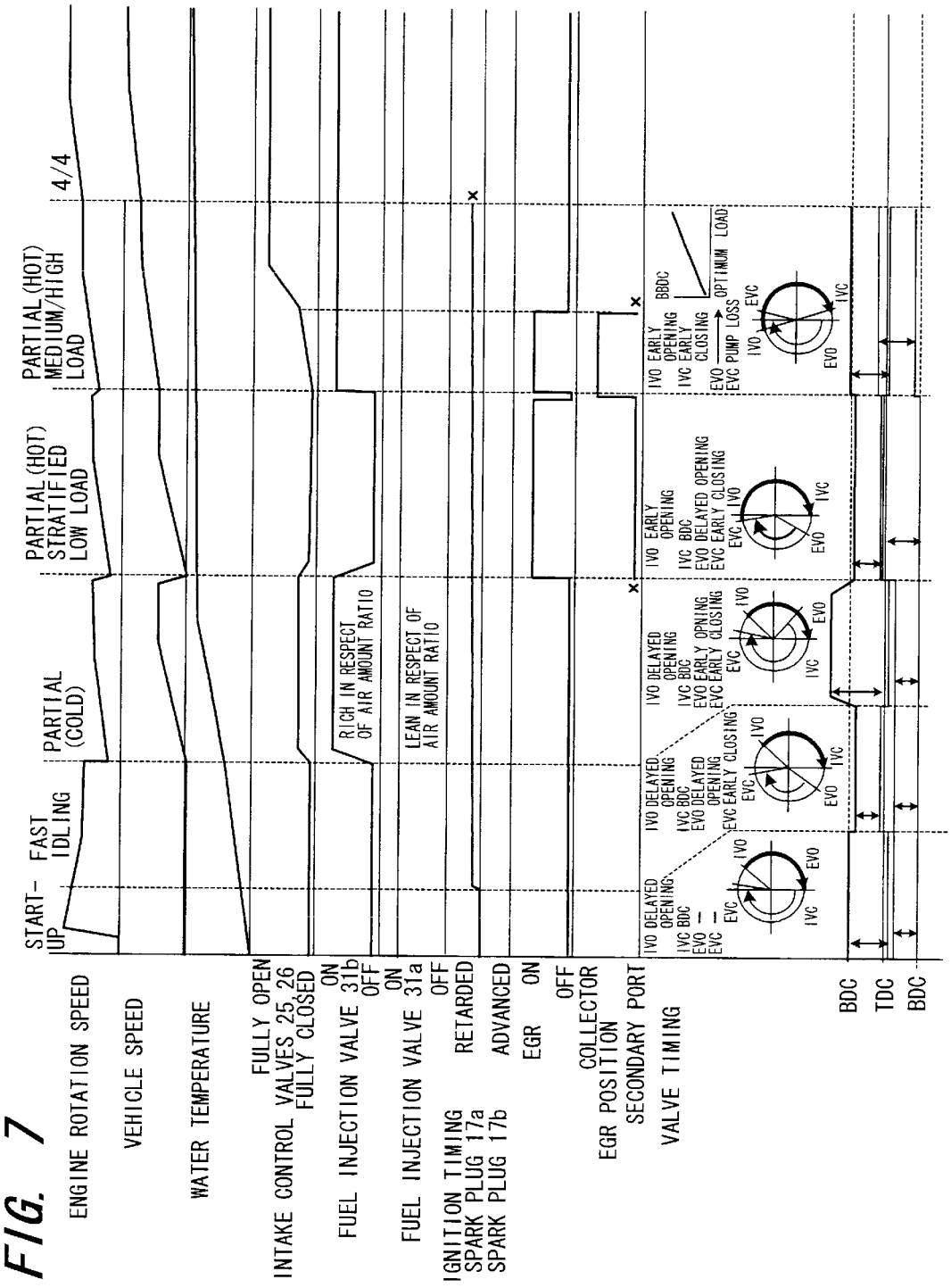
FIG. 7 is a timing chart showing a different operation.

These timing charts illustrate, in sequence from the top down in the ordinate direction, engine rotation speed, vehicle speed, engine cooling water temperature, the degree of opening of the intake control valves 25, 26, operation of the secondary side fuel injection valve 31b, operation of the primary side fuel injection valve 31a, ignition timing of the spark plugs 17a, 17b, the on/off state of exhaust gas recirculation, the introduction position of the recirculated exhaust gas (collector or port), and the valve timing of the intake valves and exhaust valves, and in the abscissa direction illustrate the engine operating conditions, these being, in sequence from left to right, an engine start-up period, a fast idling period, an engine partial period (cold), an engine partial period (stratified combustion low load when hot), an engine partial FIG. 6 mainly differs from FIG. 4 in the respective operations of the intake control valve, secondary side fuel injection valve, spark plugs, and exhaust valves during the fast idling period, and FIG. 7 differs from FIG. 4 in the respective injection valve, and exhaust valves during the partial period (cold). All other operations are identical to FIG. 4.

1. Engine Start-Up Period

As shown in the timing chart in FIG. 4, during operating conditions in which combustion is difficult to stabilize, such as during engine start-up, the half-closing valve 25 of the primary port 14a is closed by the controller 50, as is the fully-closing valve 26 of the secondary port 14b. As a result, when the intake valves 12a, 12b are opened, intake air flows only into the upper channel 22a of the primary port 14a. It should be noted that at this time, the exhaust gas recirculation control valve 34 is also fully closed and exhaust gas recirculation is halted. The valve opening timing of the intake valves 12a, 12b (IVO) is set later than intake top dead center, and the two spark plugs 17a and 17b ignite simultaneously.

The fuel injection amount is set to an appropriate flow rate for start-up in accordance with the intake air amount and the rotation speed, but fuel is supplied only from the fuel injection valve 31a of the primary port 14a. Thus the air and fuel in the upper channel 22a of the primary port 14a mix and flow into the combustion chamber 15.

At this time, the intake air flow which has entered the upper channel 22a from upstream of the half-closing valve 25 is accelerated to reach a sufficiently high speed in the channel 22a which has a cross section reduced to half that of a normal intake port, and, since the opening timing of the intake valve 12a is later than normal opening timing, fuel atomization and vaporization of the fuel injected into the intake port is sufficiently accelerated.

As is also shown in FIG. 2, the intake air flow smoothly enters the combustion chamber 15 from the upper channel 22a through one of the intake valves 12a, and since this intake valve 12a is in an offset position from the center of the combustion chamber, a strong gas flow with a swirl flow as a central flow component is produced inside the combustion chamber due to the high-velocity intake air flow provided with sufficient directivity in the upper channel 22a.

As a result, fuel and air mixing is further accelerated, and despite being under the engine low temperature condition a sufficiently vaporized air-fuel mixture is ignited by the two spark plugs 17a, 17b simultaneously. Thus stable ignition is performed and the gas flow through the combustion chamber to thereby realize stable combustion during start-up.

By increasing combustion stability during start-up in this manner, the increasing amount of fuel during start-up does not have to be significantly increased, leading to a reduction in fuel consumption.

Figure 5:
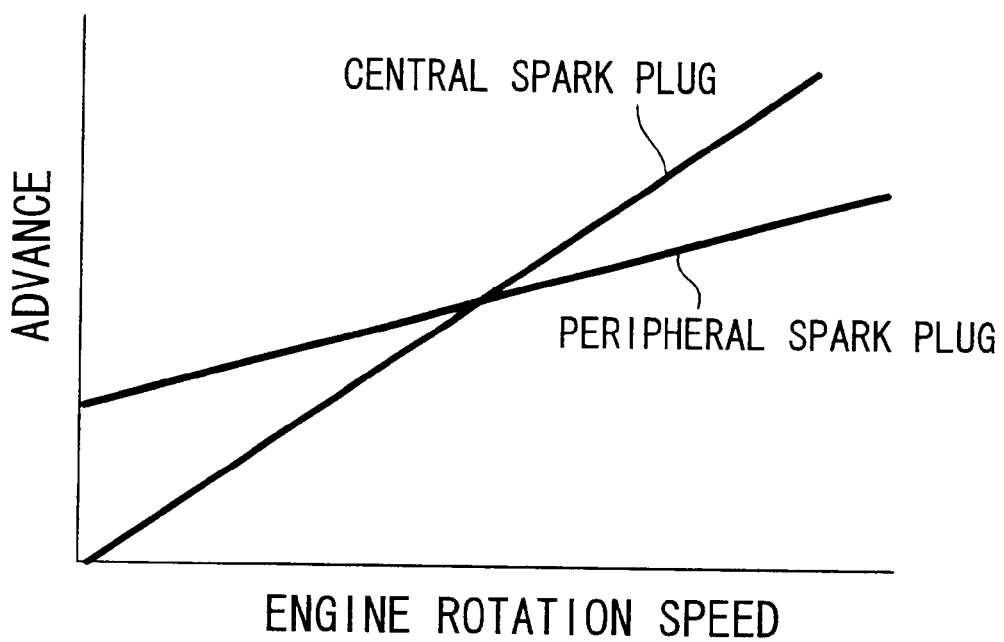
FIG. 5 is an illustrative view of the operational characteristic of a spark plug.

Further, as shown in FIG. 5, the ignition timing of the peripheral spark plug 17b is made earlier than that of the spark plug 17a in the center of the combustion chamber rather than the ignition timing of the two spark plugs 17a, 17b being simultaneous, and although these ignition timings both advance in accordance with increases in the engine rotation speed, the degree of advance in the ignition timing of the central spark plug 17a relative to increases in engine speed is larger. Thus as the engine speed increases, from a certain engine speed boundary the central spark plug 17a starts to ignite earlier than the peripheral spark plug 17b.

As a result, engine speed variation during start-up which arises from the fuel properties can be suppressed by controlling the phase difference in the ignition timing. Alternatively, by igniting the spark plug 17a in the center of the combustion chamber first and igniting the peripheral spark plug 17b thereafter when the engine speed drops following the upsurge in engine rotation directly after start-up, the reduction in engine torque is compensated for and thus the drop in engine speed may be suppressed.

In so doing, the amount of increase in start-up fuel may be reduced from conventional engine.

2. Fast Idling Operating Period

During fast idling, similarly to the aforementioned start-up period, the controller 50 closes the half-closing valve 25 and the fully-closing valve 26 of the primary port 14a of the intake port 14, and thus when the intake valves 12a, 12b open, intake air flows only into the upper channel 22a of the primary port 14a.

Thus fuel is injected only from the fuel injection valve 31a on the primary side and the fuel injection amount is set to a slightly lean air-fuel ratio (in other words, excess air ratio_is set as_=1.1 approximately). Note that the exhaust gas recirculation control valve 34 is fully closed and exhaust gas recirculation is halted.

The opening timing of the intake valves 12a, 12b (IVO) is set later than intake top dead center, the closing timing thereof (IVC) is set at bottom dead center, the opening tiring of the exhaust valves 13a, 13b (EVO) is set later than bottom dead center, and the closing timing thereof (EVC) is set to be earlier than top dead center.

On the spark plugs 17a and 17b, the ignition timing of the peripheral spark plug 17b is set to be later (retarded) than that of the spark plug 17a in the center of the combustion chamber.

As a result, air-fuel mixture flows into the combustion chamber 15 only from the primary port 14a to produce a strong swirl. Moreover, due to the acceleration in fuel vaporization caused by the intake valves 12a, 12b opening later than usual, the combustion speed of the air-fuel mixture in the combustion chamber increases such that a stable combustion characteristic is ensured even with a lean air-fuel ratio. Further, by igniting the air-fuel mixture in the central portion first using the spark plug 17a in the center of the combustion chamber and igniting the remaining peripheral air-fuel mixture using the peripheral spark plug 17b which ignites later, favorable combustion can be maintained in all regions of the combustion chamber.

Hence during the fast idling period, combustion stability is improved and fuel consumption is further reduced. Further, by making the air-fuel ratio slightly lean, early catalytic activation is attained to thereby improve emissions.

The following control may be performed instead of the control described above.

That is, as is illustrated in the timing chart in FIG. 6, the fully-closing valve 26 of the secondary port 14b is slightly opened such that a small amount of intake air also flows from the secondary port 14b, and fuel is also injected from the fuel injection valve 31b on the secondary side. At this time, the fuel injection valve 31a on the primary side injects an amount of fuel to form a lean air-fuel ratio with the intake air flow from the primary port 14a, and the fuel injection valve 31b on the secondary side injects an amount of fuel to form a rich air-fuel ratio with the small amount of intake air flow on the secondary side. The respective fuel injection amounts are set so that when both air-fuel mixtures are combined, the average air-fuel ratio is lean.

The lean air-fuel ratio from the primary port 14a and the rich air-fuel ratio from the secondary port 14b exist in the combustion chamber in a layered state and form a gas flow comprising a swirl component.

In this case, even if a slight unevenness occurs in the fuel density due to irregularities in the air-fuel mixture concentration, comparatively stable combustion is performed, similar to when the half-closing valve 25 and fully-closing valve 26 are fully closed, by means of the strong gas flow possessing sufficient directivity. In this case a comparatively large amount of unburned HC and the like is contained in the exhaust gas, and that by burning this unburned HC and the like in the exhaust system such that the exhaust system is caused to function as a thermal reactor, high temperature exhaust gas is led to the catalyst, causing the catalyst temperature to rise. In other words, the catalyst is heated as quickly as possible when the engine is in the cold condition. Furthermore, at this time the total air-fuel ratio in the entire combustion chamber is set to slightly lean (for example_=1.1), and thus an oxidation reaction is maintained in the catalyst to thereby accelerate early activation.

Further, by setting both of the spark plugs 17a, 17b to relative retarded sides, combustion delay can be increased, and by setting the opening timing of the exhaust valves 13a, 13b (EVO) to an early timing, high temperature exhaust gas containing many unburned components can be discharged to thereby increase the reaction in the catalyst and further accelerate the early activation thereof.

Note that instead of opening the exhaust valves 13a, 13b at an early timing in this manner, any one of the exhaust valves 13a or 13b may be left closed. In this case, exhaust gas flows into the exhaust port from only one of the exhaust valves 13a or 13b, and since the surface area of the port into which the exhaust gas flows may be reduced, decreases in the exhaust gas temperature can be reduced such that the temperature of the 3. Period of Partial Operation when the Engine is Cold In FIG. 4, control is performed in basically the same manner during the period of partial operating when the engine is cold (partial load operating period) as during the fast idling period.

When air-fuel mixture is introduced only from the primary port 14a, the combustion characteristic is improved on the basis of a strong swirl in the combustion chamber, whereby the air-fuel ratio in the cold state can be made lean and fuel consumption can be reduced.

On the other hand, when the half-closing valve 25 and fully-closing valve 26 are slightly opened and fuel is injected only from the fuel injection valve 31a, lean air-fuel mixture is introduced from the upper and lower channels 22a, 22b of the primary port 14a, whereas only a small amount of fresh air is introduced from the secondary port 14b. As a result, a stratified state with a tumble flow as the main flow component thereof is formed in the combustion chamber from an air-fuel mixture layer from the primary side and a fresh air layer from the secondary side. By setting the total air-fuel ratio at this time to be lean, good stratified combustion of the lean air-fuel mixture is performed.

As a result, the combustion characteristic during the cold period can be improved, and fuel consumption can be reduced. The determination of a cold condition is performed on the basis of the coolingwater temperature detected by the engine cooling water temperature sensor 54, and this control may be switched on and off in accordance with the cooling water temperature. It should be noted that at this time, in order to ensure combustion stability in a cold condition, exhaust gas recirculation is halted.

In order to raise the catalyst temperature and achieve early catalytic activation, the opening timing of the exhaust valves 13a, 13b (EVO) is brought largely advanced and the closing timing thereof (EVC) is slightly delayed, as is shown in the timing chart in FIG. 7. The opening timing of the intake valves 12a, 12b (IVO) at this time is also delayed. In so doing, high temperature exhaust gas flows into the exhaust port 18, thereby raising the temperature of the exhaust system and enabling a rapid temperature increase in the catalyst.

Once the cooling water has risen to a predetermined temperature, processing moves to control when the engine is hot, to be described herein below.

4. Period of Partial Low Load Operating When the Engine is Hot

In the period of low load operating when the engine is hot, exhaust gas recirculation is performed to achieve a reduction in NOx. Also in this low load operating condition, the half-closing valve 25 of the primary port 14a and the fully-closing valve 26 of the secondary port 14b are closed and also connected to the branch passage side by the directional control valve 36. The exhaust gas recirculation control valve 34 is opened to a degree in accordance with the amount of intake air.

Thus intake air flows through the upper channel 22a in the primary port 14a to then flow via the intake valve 12a into the combustion chamber 15 maintaining sufficient directivity. Further, recirculated exhaust gas flows into the upper channel 22a of the secondary port 14b from the recirculation port 37, and when the intake valve 12b opens, recirculated exhaust gas also flows into the combustion chamber 15 maintaining sufficient directivity. In this case, fuel is injected only from the fuel injection valve 31a of the primary port 14a and the air-fuel ratio is set to a substantially stoichiometric level.

The ignition timing of the spark plugs 17a and 17b and the open/close timing of the exhaust valves 13a and 13b are identical to the cold partial period, whereas the opening timing of the intake valves 12a, 12b (IVO) is advanced and the closing timing thereof (IVC) is set at intake bottom dead center in order to increase the amount of exhaust gas recirculated into the combustion chamber.

Since the primary port 14a and secondary 14b are parallel to one another and the intake valves 12a and 12b are arranged in equal positions on each side of the cylinder axis, the greater parts of the intake air and recirculated exhaust gas having strong directivity remain in a mutually parallel state inside the combustion chamber and therefore flow in the direction of the cylinder axis to form a tumble flow. The air-fuel mixture and recirculated exhaust gas in the combustion chamber can therefore be stratified as a tumble flow mainly comprising an air-fuel mixture layer which is then ignited by the spark plugs 17a, 17b positioned on both sides of the tumble flow, and thus even an air-fuel mixture containing a large amount of recirculated exhaust gas can be burned with stability. As a result, a vast reduction in fuel consumption due to large-scale EGR (exhaust gas recirculation) and suppression of NOx can be achieved with no deterioration in operating performance. If the amount of exhaust gas recirculation is controlled by the exhaust gas recirculation control valve 34 such that the ratio of intake air from the primary port 14a and recirculated exhaust gas from the secondary port 14b becomes 1:1, the two flow rates are equalized, or in other words the left and right side flows become symmetrical, whereby gas flow stratification in the combustion chamber is performed most favorably. As a result, the EGR threshold region is extended such that, regardless of the large amounts of exhaust gas recirculation, combustion stability can be maintained and further reductions in fuel consumption and NOx can be realized.

In this low load period, if exhaust gas recirculation is halted and the half-closing valve 25 and fully-closing valve 26 are fully opened such that intake air is introduced from both the primary port 14a and secondary port 14b and fuel is injected from only one fuel injection valve, for example the fuel injection valve 31a on the primary side, an identical uniform tumble flow to that described above can be generated in the combustion chamber. In this case, the flow which enters from the primary side becomes the air-fuel mixture layer and the flow which enters from the secondary side becomes the air layer, and as a result of this stratification, stable stratified lean combustion can be realized even with an extremely lean total air-fuel ratio. In so doing, engine fuel consumption can be reduced and the exhaust emission can be improved.

5. Period of Partial Medium/High Load Operating when Engine is Hot

In the condition of medium/high load operating when the engine is hot, the half-closing valve 25 of the primary port 14a and the fully-closing valve 26 of the secondary port 14b are altered from an intermediate to a maximum degree of opening in accordance with the load. As the amount of engine intake air increases, intake efficiency deteriorates if the entire required amount is supplied from only the primary port 14a, and therefore intake air is introduced from both of the intake ports 14. When not in a frill load condition (full throttle condition), however, the fully-closing valve 26 of the secondary port 14b is not opened fully, but rather controlled to a degree of opening in accordance with the amount of engine intake air.Fuel is supplied from both of the fuel injection valves 31a and 31b. Further, in order to mix fresh air and recirculated exhaust gas in advance to perform homogeneous exhaust gas recirculation, the directional control valve 35 is switched so that the recirculated exhaust gas is led to the collector 20 rather than the branch passage 36. As a result, the intake air and recirculated exhaust gas mix in the collector 20 and flow into both the primary port 14a and secondary port 14b in a uniform concentration.

Intake air flows from the primary port 14a and secondary port 14b, and since the half-closing valve 25 and fully-closing valve 26 are open to an intermediate extent, the intake air flows not only from the upper channel 22a but also from the lower channel 22b.

In this case, only the upper channel 22a of the primary port 14a is fully open, and thus the flow rate through the primary port 14a is somewhat larger than the flow rate through the secondary port 14b. Hence, of the intake air entering the combustion chamber 15, the swirl flow component heading toward the secondary port 14b side from the primary port 14a side and the respectively formed tumble flow components combine to generate a composite gas flow.

Since the recirculated exhaust gas is mixed with the air-fuel mixture in advance, a substantially uniform concentration is maintained in all regions of the combustion chamber. When the fuel in the air-fuel mixture is atomized and vaporized by the gas flow generated inside the combustion chamber and subjected to two point ignition by the two spark plugs 17a, 17b, the propagation distance to be traveled by the flame is shortened, and thus stable combustion can be completed within a short time period even when the air-fuel mixture contains recirculated exhaust gas. As a result, simultaneous reductions in NOx and in fuel consumption can be achieved. It should be noted that in this medium load operating region, by altering the opening of the half-closing valve 25 and fully-closing valve 26 in accordance with the amount of intake air, the gas flow may be controlled to the most appropriate state for improvements in combustion.

As the opening of the half-closing valve 25 and fully-closing valve 26 increases and the engine load nears a higher load than a predetermined value, the exhaust gas recirculation control valve 34 is closed and exhaust gas recirculation is halted. In so doing, engine output is raised and a favorable operating characteristic can be maintained.

The open/close timing of the intake valves 12a, 12b and exhaust valves 13a, 13b is preferably controlled to the most appropriate condition for alleviating pumping loss. For example, the opening timing (IVO) and closing timing (IVC) of the intake valves 12a, 12b are advanced, the opening timing of the exhaust valves 13a, 13b (EVO) is altered according to the load, and the closing timing thereof (EVC) is delayed.

6. Engine Full Load (Full Throttle) Operating Period

In the high load operating region following warming, the half-closing valve 25 and fully-closing valve 26 are both fully opened such that intake air is led into the combustion chamber 15 uniformly from both the primary port 14a and the secondary port 14b. Fuel is injected from both of the fuel injection valves 31a, 31b, and exhaust gas recirculation is halted.

Since both the half-closing valve 25 and fully-closing valve 26 are fully open, resistance in the intake air flowing through the intake port 14 is at a minimum, and thus engine intake efficiency is at its most favorable and high output is manifested in the engine.

It should be noted that in this operating region the temperature is high, depression is low, and the combustion conditions are favorable, and therefore increases in combustion noise and vibration can be suppressed by performing ignition using the central spark plug 17a alone.

Figure 8:
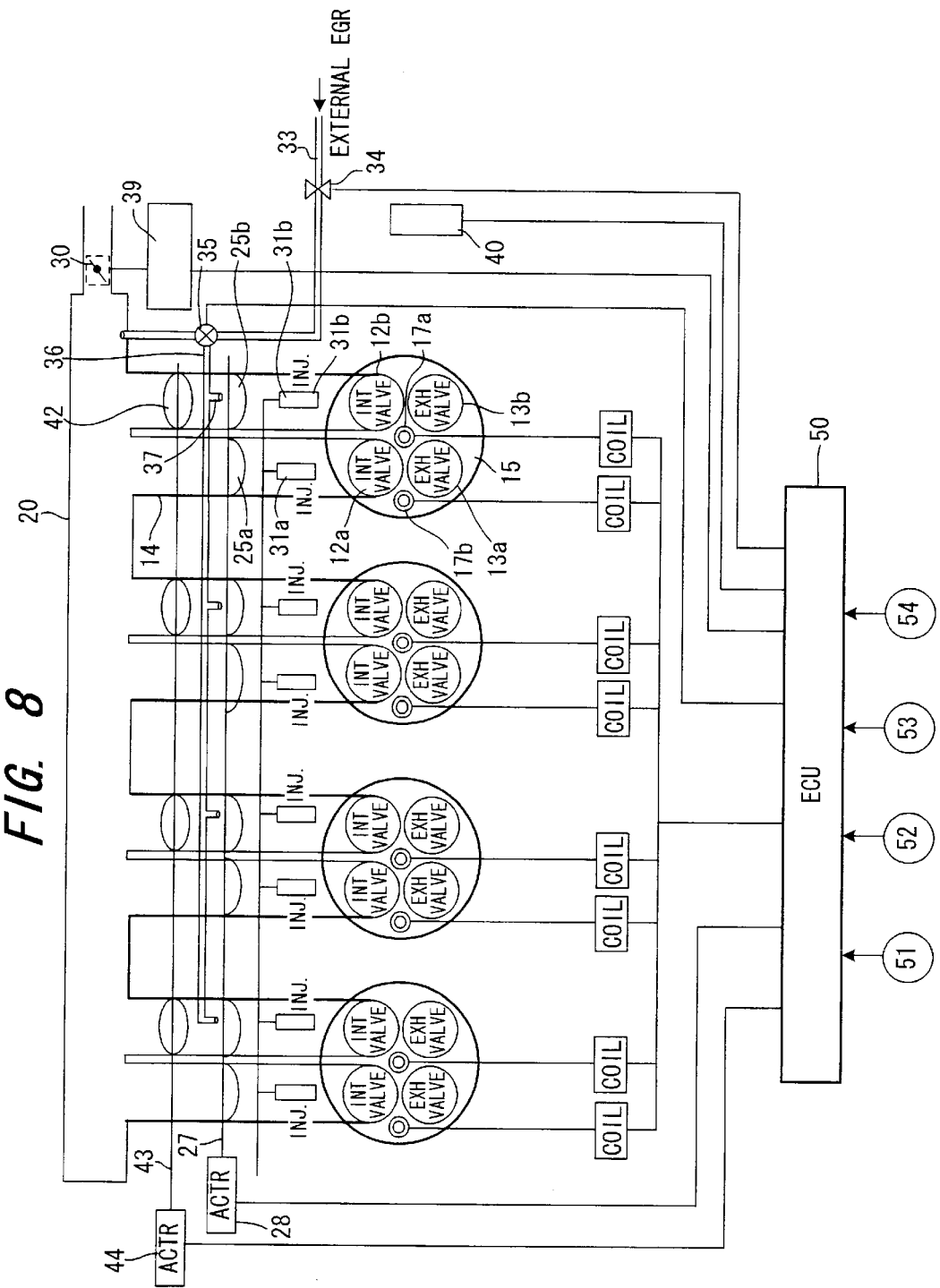
FIG. 8 is a schematic diagram of a second embodiment of this invention.
Figure 9:
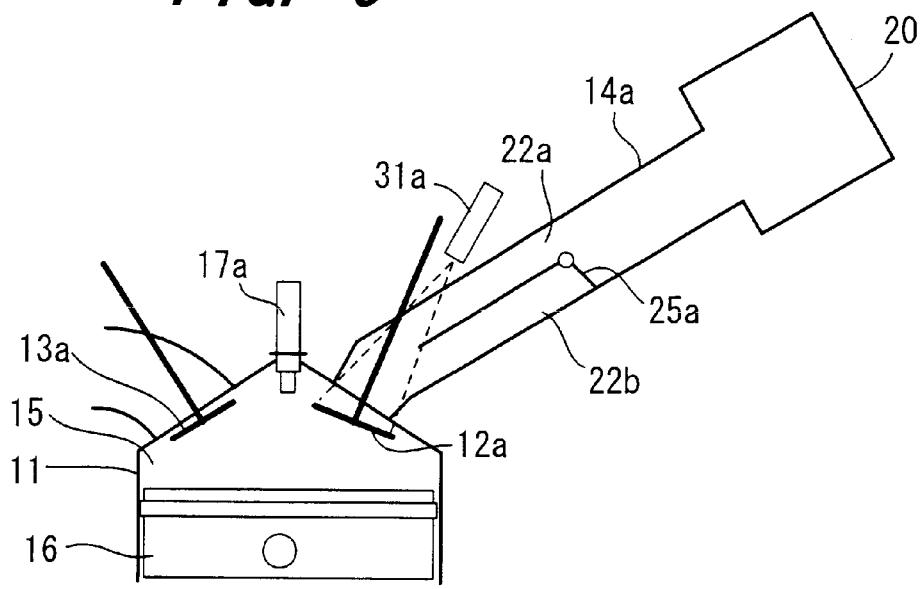
FIG. 9 is a cross section of a primary intake port.
Figure 10:
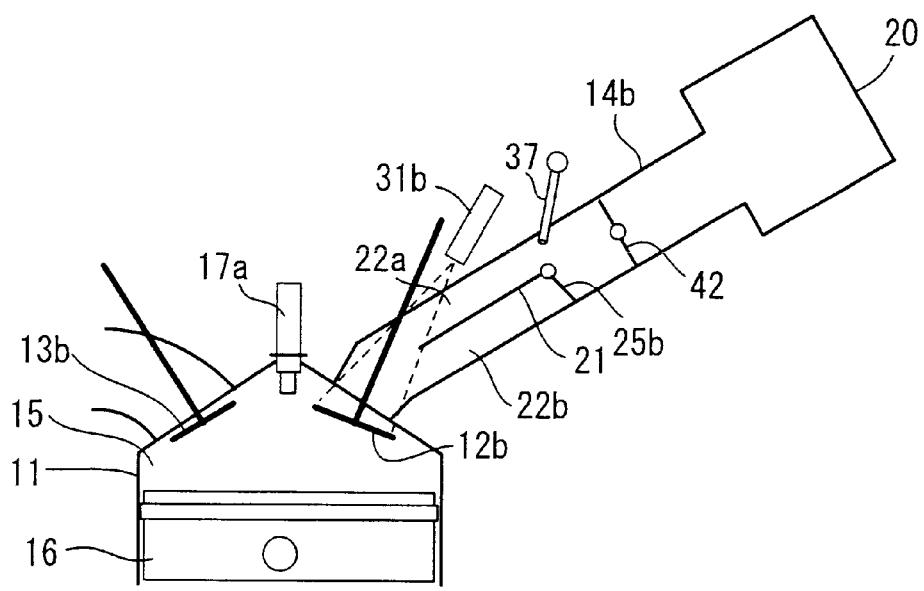
FIG. 10 is a cross section of a secondary intake port.

A second embodiment will be described with reference to FIGS. 8 through 10.

The second embodiment differs from the first embodiment in the following points. Firstly, half-closing valves 25a, 25b are provided as intake control valves in only the lower channel 22b of both the primary port 14a and the secondary port 14b. Further, a shut-off valve 42 is provided upstream of the half-closing valve 25b in the secondary port 14b. The shut-off valves 42 in each of the cylinders are attached to a rotary shaft 43 in phase with one another, and are open/close driven in unison by a rotary actuator 44. Further, a recirculation port 37 is opened in a position between the shut-off valve 42 and the half-closing valve 25b for introducing recirculated exhaust gas into the secondary port 14b.

Thus in this embodiment, control in the engine start-up period, fast idling period, and cold period is performed similarly to the first embodiment with the shut-off valve 42 of the secondary port 14b fully closed and the half-closing valves 25a, 25b closed. In the low load period when the engine is hot, exhaust gas recirculation is performed only from the secondary port 14b so that stratification is achieved in the combustion chamber, and thus NOx can be reduced without harming the operating performance.

Further, in the medium load period, by fully opening the shut-off valve 42 and performing exhaust gas recirculation from the collector side while controlling the opening of the half-closing valves 25a, 25b in accordance with the engine load, the gas flow into the combustion chamber can be controlled appropriately to attain a reduction in NOx and an improvement in the combustion characteristic. High engine output can be generated at the engine full throttle operation by similarly opening the shut-off valve 42 and half-closing valves 25a, 25b fully with exhaust gas recirculation halted.

Also during the engine fast idling period or the cold period, the shut-off valve 42 is slightly opened and the half-closing valves 25a, 25b are slightly opened such that intake air also flows from the secondary port 14b, although in a smaller amount than from the primary port 14a, and fuel injection is also performed from the secondary side in addition to the primary side. At this time, the air-fuel ratio on the low flow rate secondary side is controlled to become rich. Then, by setting average air-fuel ratio both of the primary side and the secondary side to become lean, comparatively stable combustion is maintained by a swirl even when irregularities arise in the air-fuel mixture concentration distribution throughout the combustion chamber, and furthermore, unburned components in the exhaust gas which is discharged from the combustion chamber 15 during the exhaust stroke may be increased to effect early catalytic activation. In this case, during the low load condition when the engine is cold, a swirl can be generated in the combustion chamber to enable combustion with a lean air-fuel mixture by halting fuel injection on the secondary side and causing only a small amount of intake air to flow from the secondary port 14b.

Also in this embodiment, the shut-off valve 42 is provided on the upstream of the secondary port 14b and identical half-closing valves 25a, 25b are arranged in the primary port 14a and secondary port 14b so as to be opened and closed in phase. Thus during the low load period when the engine is hot, for example, the flow of intake air on the primary side and secondary side can be controlled in exactly the same manner, that is the distribution of intake air in the upper channel 22a and lower channel 22b can be matched, when the shut-off valve 42 is left fully open and the half-closing valves 25a, 25b are opened and closed in synchronization with each other. As a result, stratification in the combustion chamber of the tumble flow on the primary side and secondary side becomes easy, and when fuel is injected in this state from either of the fuel injection valves 31a or 31b, an air-fuel mixture layer and an air layer can be formed. As a result of this stratification in the combustion chamber, stable combustion is possible even with a lean air-fuel mixture.

In the case described above, in which exhaust gas is recirculated into the intake port 14 through the recirculation port 37, the recirculation port 37 can be disposed in an upstream position removed from the fuel injection valve 31b, thus preventing recirculated exhaust gas from clogging the fuel injection valve 31b.

Figure 11:
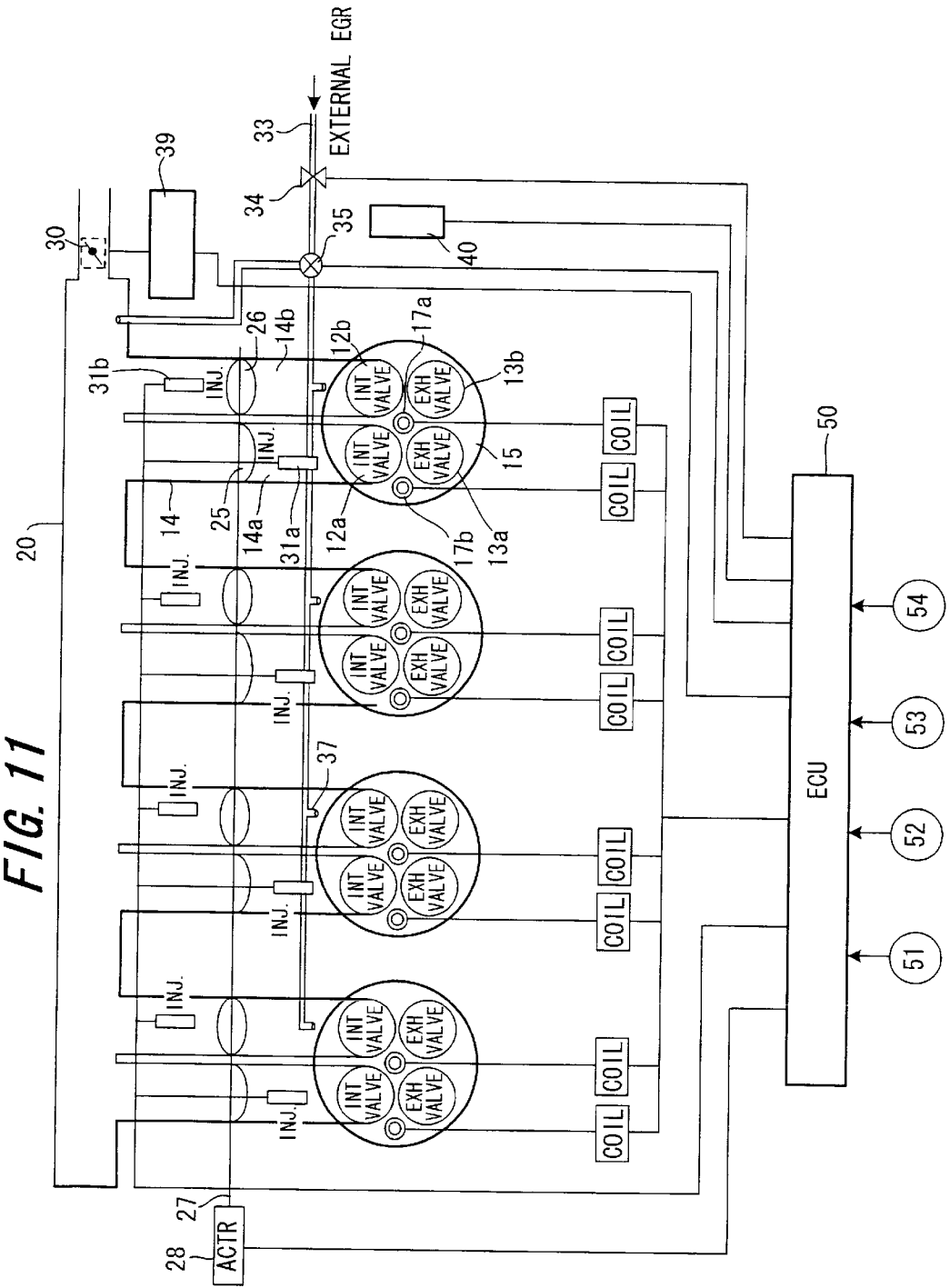
FIG. 11 is a schematic diagram of a third embodiment of this invention.
Figure 12:
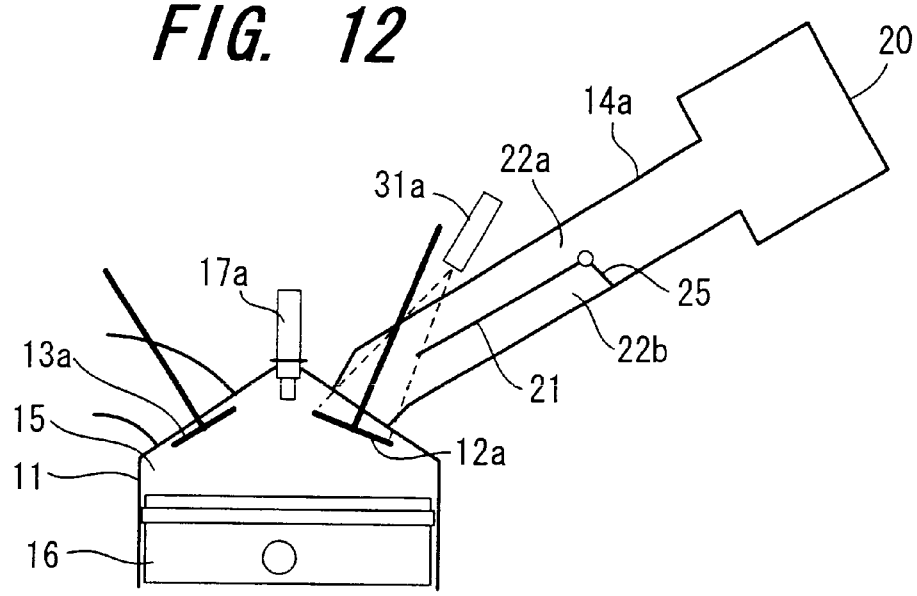
FIG. 12 is a cross section of a primary intake port.
Figure 13:
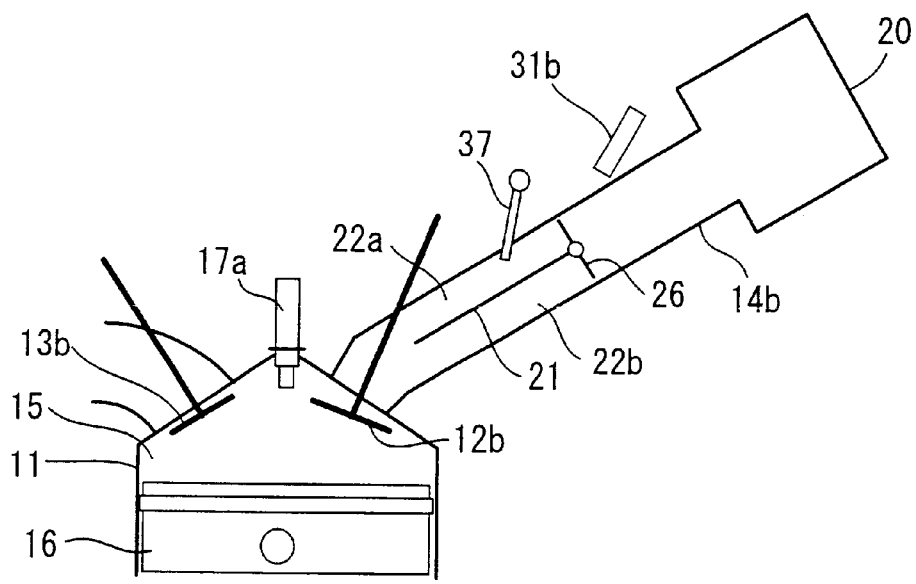
FIG. 13 is a cross section of a secondary intake port.

A third embodiment will be described with reference to FIGS. 11 through 13.

This third embodiment differs from the first embodiment in that the fuel injection valve 31b of the secondary port 14b is disposed on the upstream side rather than the downstream side of the fully-closing valve 26.

In so doing, the fuel injection valve 31b is not exposed to high temperature exhaust gas even when exhaust gas is recirculated to the intake port 14 through the recirculation port 37, and thus the fuel injection valve 31b can be protected.

The control operations in this case are basically identical to those of the first embodiment. However, if fuel is injected from the fuel injection valve upstream of the fully-closing valve 26 during the engine fast idling period, when a small amount of intake air is released from the secondary port 14b in order to accelerate catalytic activation, a large amount of this fuel may become adhered to the fully-closing valve 26, and it is therefore possible to release only intake air without injecting fuel into the secondary side.

In the aforementioned first through third embodiments, the half-closing valves 25, 25a, 25b are all designed to open and close the lower channel 22b of the intake port 14, but these valves may be disposed so as to open and close the upper channel 22a. It should be noted, however, that when large-scale exhaust gas recirculation is performed during the low load operating period when the engine is hot, the lower channel 22b of the intake port 14 should preferably be closed, as in the first through third embodiments, in order to ensure combustion stability. In so doing, the air-fuel mixture layer from the primary side and the recirculated exhaust gas layer from the secondary side maintain a strong tumble flow inside the combustion chamber, by means of which favorable stratified combustion is performed.

The primary port 14a and secondary port 14b are divided internally into the upper and lower channels 22a, 22b by the partition wall 21, but the secondary port 14b may be formed as a single channel instead of being partitioned by the partition wall 21.

Other embodiments regarding the disposal of the spark plugs will now be described.

Figure 14:
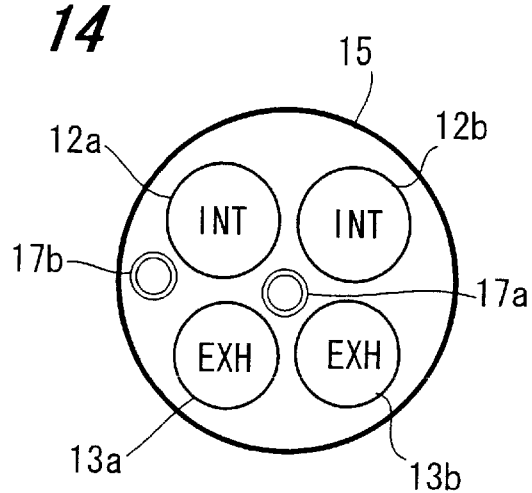
FIG. 14 is a schematic plan view of a combustion chamber showing an aspect of spark plug disposal.
Figure 15:
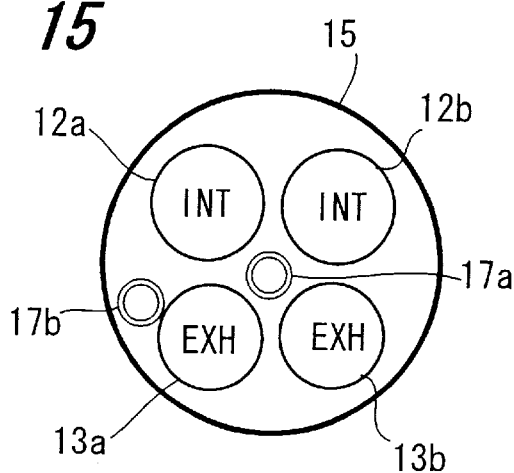
FIG. 15 is a schematic plan view of a combustion chamber showing different aspect of spark plug disposal.

The position of the central spark plug 17a in FIG. 14 is identical to FIG. 1, but the position of the peripheral spark plug 17b has been moved slightly closer to the intake valve 12a. In FIG. 15, the position of the central spark plug 17a does not change, but the peripheral spark plug 17b has been moved slightly closer to the exhaust valve 13a side. A favorable combustion characteristic can be ensured in the same manner as FIG. 1 both when exhaust gas recirculation is performed and exhaust gas recirculation is halted.

Figure 16:
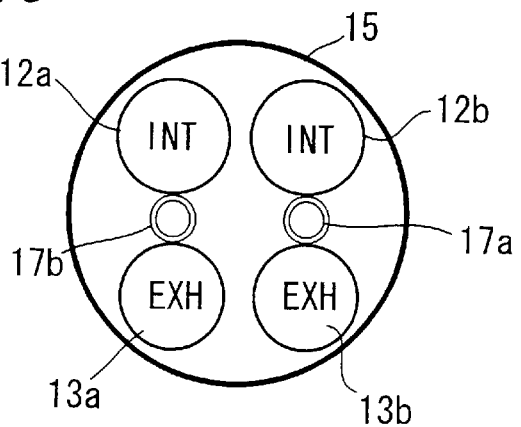
FIG. 16 is a schematic plan view of a combustion chamber showing further different aspect of spark plug disposal.

In FIG. 16, the spark plugs 17a and 17b are disposed between the opposing intake valve 12a and exhaust valve 13a, and the opposing intake valve 12b and exhaust valve 13b. In this case, during exhaust gas recirculation cessation and homogeneous exhaust gas recirculation, simultaneous ignition is performed by the two spark plugs 17a, 17b, whereas during stratified exhaust gas recirculation, ignition is mainly performed on the primary side. As a result, an ignition action in both of the required ignition positions can be performed, enabling a favorable combustion characteristic in both positions.

Figure 17:
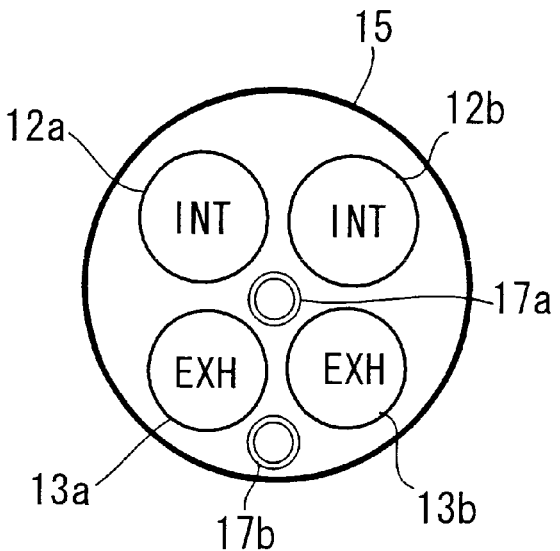
FIG. 17 is a schematic plan view of a combustion chamber showing further different aspect of spark plug disposal.

In FIG. 17, the position of the central spark plug 17a is identical to that in FIG. 1, but the peripheral spark plug 17b is disposed between and on the outside of the two exhaust valves 13a, 13b. During exhaust gas recirculation cessation and homogeneous exhaust gas recirculation, ignition is mainly performed by the central spark plug 17a, whereas during stratified exhaust gas recirculation, ignition is performed by the two spark plugs 17a and 17b. As a result, stable combustion is achieved. In this case, by disposing the peripheral spark plug 17b on the outside of the exhaust valves 13a, 13b, disposal of a cooling water passage on the periphery of the spark plug in the cylinder head is facilitated.

Figure 18:
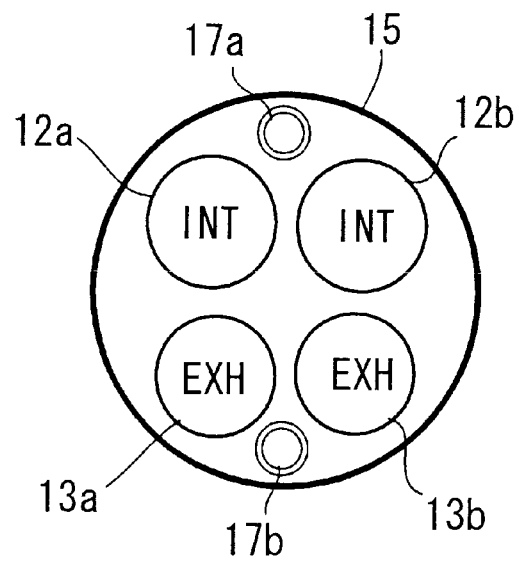
FIG. 18 is a schematic plan view of a combustion chamber showing further different aspect of spark plug disposal.

In FIG. 18, the position of the spark plug 17b is identical to that in FIG. 17, but the spark plug 17a is disposed between and on the outside of the two intake valves 12a, 12b. In so doing, the periphery of the spark plug 17a can also be cooled favorably.

It should be noted that in each of these embodiments, the spark plugs 17a, 17b may be disposed offset from, rather than parallel to, the cylinder axis in order to avoid interference with the intake valves 12a, 12b or the exhaust valves 13a, 13b which are disposed in the cylinder head. The entire contents of Japanese Patent Application P2002-117073 (filed Apr. 19, 2002) is incorporated herein by reference.

This invention is not limited to the aforementioned embodiments and may be subjected to various modifications within the scope of the technical ideas of the invention.

What is claimed is:

1. A control apparatus for an internal combustion engine having an intake valve and an exhaust valve, comprising:

at least two independent intake ports, a first and a second intake port, connected to an engine combustion chamber;

upper and lower channels which are defined by a partition wall extending along the axial direction of the interior of the first intake port;

a first intake control valve provided in the first intake port for opening and closing any one of the channels;

a second intake control valve for opening and closing the second intake port on the upstream side of the intake valve; and a controller for controlling the first and second intake control valves in accordance with the operating conditions.

2. The engine control apparatus as defined in claim 1, wherein the first intake port and the second intake port are disposed substantially in parallel to each other and in a substantially symmetrical position in respect of the center of the cylinder in the engine.

3. The engine control apparatus as defined in claim 1, wherein the first intake control valve opens and closes the lower channel.

4. The engine control apparatus as defined in claim 1, further comprising a recirculation port of an exhaust gas recirculation passage which is connected to the second intake port downstream of the second intake control valve.

5. The engine control apparatus as defined in claim 4, wherein, when recirculated exhaust gas is introduced through the recirculation port, the second intake control valve is closed and the first intake control valve is closed.

6. The engine control apparatus as defined in claim 4, wherein the second intake port is defined into upper and lower channels by a partition wall which extends along the axial direction thereof, the second intake control valve opens and closes the upper and lower channels simultaneously, and the recirculation port of the exhaust gas recirculation passage is connected to either one of the upper or lower channel.

7. The engine control apparatus as defined in claim 6, wherein, when recirculated exhaust gas is introduced through the recirculation port, the second intake control valve and intake control valve are both closed.

8. The engine control apparatus as defined in claim 1, wherein the second intake port is defined into upper and lower channels by a partition wall which extends along the axial direction thereof, and the second intake control valve opens and closes one of the upper and lower channels, further comprising;

a shut-off valve for opening and closing the second intake port is provided on the upstream of the second intake control valve, and a recirculation port of the exhaust gas recirculation passage is connected to the downstream of the shut-off valve.

9. The engine control apparatus as defined in claim 8, wherein, when recirculated exhaust gas is introduced through the recirculation port, the shut-off valve is closed and the first intake control valve is closed.

10. The engine control apparatus as defined in claim 4, further comprising an exhaust gas recirculation control valve for controlling the amount of recirculated exhaust gas, wherein, during exhaust gas recirculation, the amount of fresh air from the first intake port and the amount of recirculated exhaust gas from the second intake port are set to be substantially identical.

11. The engine control apparatus as defined in claim 1, further comprising two spark plugs in the combustion chamber, wherein the two spark plugs are ignited simultaneously or only one of the spark plugs is ignited depending on the operating conditions.

12. The engine control apparatus as defined in claim 11, wherein one of the spark plugs is disposed in the center of the combustion chamber and the other is disposed on the periphery of the combustion chamber.

13. The engine control apparatus as defined in claim 12, wherein the peripheral spark plug is disposed in a position between and on the outside of the first intake valve and the opposing exhaust valve.

14. The engine control apparatus as defined in claim 12, wherein the peripheral spark plug is disposed in a position between and on the outside of the two exhaust valves.

15. The engine control apparatus as defined in claim 11, wherein both spark plugs are disposed on the periphery of the combustion chamber, one between and on the outside of the two intake valves, and the other between and on the outside of the two exhaust valves.

16. The engine control apparatus as defined in claim 11, wherein the spark plugs are respectively disposed on the central side of the combustion chamber in a position between each intake valve and exhaust valve pair.

17. The engine control apparatus as defined in claim 1, wherein the first intake control valve and the second intake control valve are mounted on a common rotary shaft and rotate in synchronization with each other.

18. The engine control apparatus as defined in claim 1, further comprising a fuel injection valve in each of the first intake port and second intake port.

19. The engine control apparatus as defined in claim 18, wherein, when the second intake control valve is fully closed, fuel injection from the fuel injection valve in the second intake port is halted, and fuel injection is performed from the fuel injection valve in the first intake port.

20. The engine control apparatus as defined in claim 1, wherein, during an engine start-up period, the first intake control valve of the first intake port is closed and the second intake control valve of the second intake port is closed.

21. The engine control apparatus as defined in claim 20, further comprising a fuel injection valve in each of the first intake port and second intake port, wherein, during the engine start-up period, fuel injection is performed only from the fuel injection valve in the first intake port.

22. The engine control apparatus as defined in claim 4, wherein, during the engine start-up period, the first intake control valve of the first intake port is closed, the second intake control valve of the second intake port is closed, and exhaust gas recirculation is halted.

23. The engine control apparatus as defined in claim 11, wherein, during the engine start-up period, the two spark plugs are ignited simultaneously.

24. The engine control apparatus as defined in claim 20, further comprising a variable control mechanism for variably controlling the opening and closing timing of the intake valve, wherein, during the engine start-up period, the opening timing of the intake valve is retarded.

25. The engine control apparatus as defined in claim 1, wherein, during an engine fast idling period, the first intake control valve of the first intake port is closed, and the second intake control valve of the second intake port is closed.

26. The engine control apparatus as defined in claim 25, further comprising a fuel injection valve in each of the first intake port and second intake port, wherein, during the engine fast idling period, fuel injection is performed only from the fuel injection valve in the first intake port.

27. The engine control apparatus as defined in claim 4, wherein, during the engine fast idling period, the first intake control valve of the first intake port is closed, the second intake control valve of the second intake port is closed, and exhaust gas recirculation is halted.

28. The engine control apparatus as defined in claim 11, wherein, during the engine fast idling period, the two spark plugs are ignited simultaneously.

29. The engine control apparatus as defined in claim 25, further comprising a variable control mechanism for variably controlling the opening and closing timing of the intake valve, wherein, during the engine fast idling period, the opening timing of the intake valve is retarded.

30. The engine control apparatus as defined in claim 25, further comprising a variable control mechanism for variably controlling the opening and closing timing of the exhaust valve, wherein, during the engine fast idling period, the opening timing of the exhaust valve is advanced.

31. The engine control apparatus as defined in claim 25, further comprising:

two exhaust valves provided in the combustion chamber; and a control mechanism for controlling the opening and closing of the two exhaust valves independently of one another, wherein, during the engine fast idling period, one of the exhaust valves is maintained in a closed state at all times.

32. The engine control apparatus as defined in claim 4, wherein, during an engine low load period, the first intake control valve of the first intake port is closed, the second intake control valve of the second intake port is closed, and recirculated exhaust gas is introduced into the second intake port from the recirculation port.

33. The engine control apparatus as defined in claim 32, further comprising a fuel injection valve in each of the first intake port and second intake port, wherein, during the engine low load period, fuel injection is performed from only the fuel injection valve in the first intake port.

34. The engine control apparatus as defined in claim 32, further comprising an exhaust gas recirculation control valve for controlling the amount of recirculated exhaust gas, wherein, during the engine low load period, the amount of fresh air from the first intake port and the amount of recirculated exhaust gas from the second intake port are controlled to be substantially identical.

35. The engine control apparatus as defined in claim 32, further comprising a variable control mechanism for variably controlling the opening and closing timing of the intake valve and exhaust valve of the engine independently of each other, wherein, during the engine low load period, the opening timing of the intake valve is advanced and the closing timing of the exhaust valve is retarded.

36. The engine control apparatus as defined in claim 1, wherein, during an engine medium load period, the respective degrees of opening of the first intake control valve in the first intake port and the second intake control valve in the second intake port are variably controlled between a fully closed position and a fully open position in accordance with the load.

37. The engine control apparatus as defined in claim 18, wherein, during the engine medium load period, the respective degrees of opening of the first intake control valve in the first intake port and the second intake control valve in the second intake port are variably controlled between a fully closed position and a fully open position in accordance with the load, and fuel is injected from the two fuel injection valves in the first and second intake ports.

38. The engine control apparatus as defined in claim 36, further comprising a variable control mechanism for variably controlling the opening and closing timing of the intake valve and exhaust valve independently of each other, wherein, during the engine medium load period, the opening timing of the intake valve is advanced and the closing timing of the exhaust valve is retarded.

39. The engine control apparatus as defined in claim 18, wherein, during an engine high load period, the first intake control valve of the first intake port and the second intake control valve of the second intake port are fully opened, and fuel is injected from the two fuel injection valves in the first and second intake ports.

\* \* \* \* \*